Figure 1:
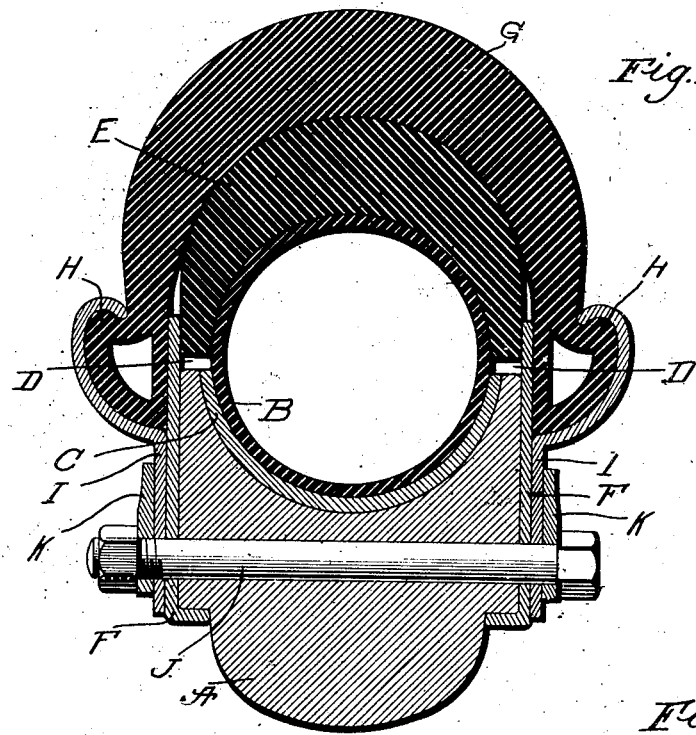

No. 877,970. PATENTED FEB. 4, 1908.
O. UHLMANN.
PNEUMATIC TIRE.
APPLICATION FILED FEB. 16, 1907.

Witnesses.
W. C. Lunsford.
Joseph M. Ward.

Inventor.
Otto Uhlmann,
By Gregory
Attys.

UNITED STATES PATENT OFFICE.

OTTO UHLMANN, OF TAUNTON, MASSACHUSETTS.

PNEUMATIC TIRE.

No. 877,970.

Specification of Letters Patent.

Patented Feb. 4, 1908.

Application filed February 16, 1907. Serial No. 357,602.

*To all whom it may concern:*

Be it known that I, OTTO UHLMANN, a citizen of the United States, residing at Taunton, in the county of Bristol and State of Massachusetts, have invented an Improvement in Pneumatic Tires, of which the following description, in connection with the accompanying drawing, is a specification, like letters on the drawing representing like parts.

This invention relates to a pneumatic tire construction for vehicles, and comprises to a certain extent the construction of the wheel of the vehicle.

The object of the invention is to provide a pneumatic tire of the inner-tube variety, and of such character that the inner tube may be readily and easily removed for repairs and renewals, and at the same time be as little subject to puncture and blow-outs as possible.

The nature of the invention will be apparent from the accompanying description and drawings, and will be more particularly pointed out in the claims.

The drawings represent a portion of the vehicle wheel and tire sufficient to illustrate the invention.

Figure 2:
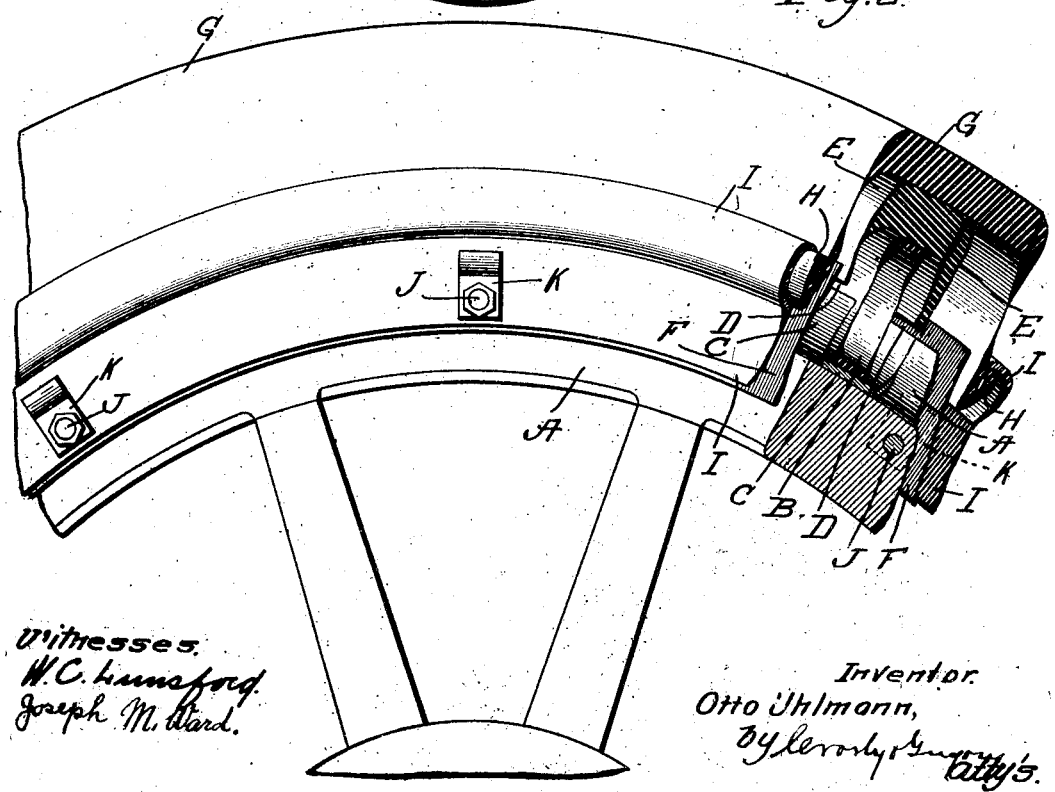

In the drawings, Figure 1 is a radial cross-section through the tire, felly and adjacent parts. Fig. 2 is a side elevation of a sector of the vehicle wheel with its elements broken away to show the construction.

The vehicle wheel as to its spokes and hub may be of any usual construction and size according to the purposes for which it is to be used. The felly of the wheel, shown at A, is concaved at its perimeter, the concavity being of the proper size to receive the inner half of the ordinary inner pneumatic tube shown at B. A suitable protective cushion or seat is placed between the pneumatic tube B and the concavity of the felly, and is shown as an annular concaved strip C. A convexed tube cover or casing E surrounds the upper portion of the inner tube B, and extends downward to the perimeter of the felly, from which it is separated by an air space D. This tube cover may be made of any suitable material, such as built-up rubber and canvas.

At each side of the felly is located an annular metal plate F, that extends above the lower part of the tube cover E, so as to separate it from the outer tire casing.

The outer tire casing, made of the usual built-up structure of canvas and rubber, or other suitable material, is shown at G, and is formed at each lower edge with a projecting flange or heel piece H. This outer casing extends down on the exterior of the annular plates F and overlaps the upper edge of the felly.

The outer casing supported interiorly by the annular plates F is held in place at each side by a second annular plate I, provided with hook-shaped flanges or sockets at its upper end to engage the heel piece H of the outer casing.

At intervals along the perimeter of the wheel and preferably between each pair of spokes, bolts J are provided that pass through the annular plates I and F and the felly A. These bolts are preferably provided at each end with suitable metallic washers K, bearing against the annular plates I.

The construction of the wheel and tire is thus extremely simple and strong. Whenever it is desired to remove or obtain access to the inner tube the nuts (which are arranged to be on the outside of the wheel) of the bolts J are removed and the two annular plates I and F on the outside of the wheel can be taken off, thus releasing the heel piece of the outer casing from the annular socket of the annular plate I.

The heel piece of the outer casing may be split at intervals to make still easier the access to the inner tube. The opposite side of the tire may remain entirely undisturbed during the operation of gaining access to or removing and replacing the inner tube from the outside of the wheel.

The annular plates are so arranged as to protect the inner tube against blowouts and its upper face portion is heavily protected by the two independent coverings formed by the tube cover E and the outer casing G against puncture. It will thus be seen that a construction is presented which resists so far as possible blow-outs and punctures and renders readily accessible the inner tube.

Having described my invention, what I claim as new and desire to secure by Letters Patent, is:

1. A vehicle wheel comprising a concaved felly, a pneumatic inner tube resting in said felly, a convexed tube cover fitting over the outer portion of the inner tube, a removable annular plate at each side the felly extending partially over the tube cover, an outer casing extending over the tube cover and upper portion of said annular plates and provided with a heel piece at each lower edge, a removable annular plate at each side the felly outside said annular plate and provided with a hook-shaped flange at its upper edge to grasp said heel piece, and means for maintaining the parts in assembled position.

2. A vehicle wheel comprising a concaved felly, a pneumatic inner tube resting in said felly, a convexed tube cover fitting over the outer portion of the inner tube, a removable annular plate at each side the felly extending partially over the tube cover, an outer casing extending over the tube cover and upper portion of said annular plates and provided with a heel piece at each lower edge, a removable annular plate at each side the felly outside said annular plate and provided with a hook-shaped flange at its upper edge to grasp said heel piece, and a series of bolts passing through and uniting said annular plates and felly to hold the parts in assembled position.

In testimony whereof, I have signed my name to this specification, in the presence of two subscribing witnesses.

OTTO UHLMANN.

Witnesses:
   CHRISTIAN HESS,
   JOSEPH NEWSHAM.